(12) United States Patent
Kalman et al.

(10) Patent No.: US 8,671,397 B2
(45) Date of Patent: Mar. 11, 2014

(54) SELECTIVE DATA FLOW ANALYSIS OF BOUNDED REGIONS OF COMPUTER SOFTWARE APPLICATIONS

(75) Inventors: Daniel Kalman, Herzelyia (IL); Dmitri Pikus, Haifa (IL); Omer Tripp, Hertzeliya (IL); Omri Weisman, Herzelyia (IL)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 13/246,260

(22) Filed: Sep. 27, 2011

(65) Prior Publication Data

US 2013/0081002 A1    Mar. 28, 2013

(51) Int. Cl.
*G06F 9/44* (2006.01)
(52) U.S. Cl.
USPC .............................. 717/132; 717/131; 717/133
(58) Field of Classification Search
USPC .................. 717/131–140, 144–146, 154–157
See application file for complete search history.

(56) References Cited

U.S. PATENT DOCUMENTS

| | | | | |
|---|---|---|---|---|
| 5,802,373 A * | 9/1998 | Yates et al. | | 717/139 |
| 5,838,979 A * | 11/1998 | Hart et al. | | 717/146 |
| 6,029,002 A * | 2/2000 | Afifi et al. | | 717/131 |
| 6,804,814 B1 * | 10/2004 | Ayers et al. | | 717/135 |
| 6,813,761 B1 * | 11/2004 | Das et al. | | 717/132 |
| 6,983,456 B2 * | 1/2006 | Poznanovic et al. | | 717/133 |
| 7,039,909 B2 * | 5/2006 | Wu et al. | | 717/156 |
| 7,065,634 B2 * | 6/2006 | Lewis et al. | | 712/227 |
| 7,089,537 B2 * | 8/2006 | Das et al. | | 717/132 |
| 7,240,335 B2 * | 7/2007 | Angel et al. | | 717/130 |
| 7,500,230 B2 * | 3/2009 | Edwards et al. | | 717/141 |
| 7,512,936 B2 * | 3/2009 | Schneider et al. | | 717/136 |
| 7,779,394 B2 * | 8/2010 | Homing et al. | | 717/136 |
| 7,823,135 B2 * | 10/2010 | Horning et al. | | 717/127 |
| 8,001,527 B1 * | 8/2011 | Qureshi et al. | | 717/120 |
| 8,327,339 B2 * | 12/2012 | Scholz et al. | | 717/132 |
| 8,336,034 B2 * | 12/2012 | Sinha | | 717/131 |
| 8,359,584 B2 * | 1/2013 | Rao et al. | | 717/133 |
| 8,407,678 B2 * | 3/2013 | Greene | | 717/134 |
| 8,527,965 B2 * | 9/2013 | Cifuentes et al. | | 717/131 |
| 8,555,260 B1 * | 10/2013 | Kizhepat et al. | | 717/140 |
| 2008/0276228 A1 | 11/2008 | Sreedhar | | |
| 2009/0328185 A1 | 12/2009 | Berg et al. | | |

OTHER PUBLICATIONS

Duesterwald et al, "A Practical Framework for Demand-Drive Interprocedural Data Flow Analysis", ACM Trans. on Prog. Lang. & Sys. vol. 19, No. 6, pp. 992-1030, 1997.*

(Continued)

*Primary Examiner* — Anil Khatri
(74) *Attorney, Agent, or Firm* — Patents on Demand P.A.; Brian K. Buchheit; Scott M. Garrett

(57) ABSTRACT

Performing data flow analysis of a computer software application, including, for a data flow analysis type, identifying within a computer software application code base a plurality of seeds relating to the data flow analysis type, for each of the plurality of seeds, defining a portion of the computer software application code base to a predefined depth of calls backward from the seed and to a predefined depth of calls forward from the seed, thereby resulting in a plurality of bounded portions of the computer software application code base, detecting a change in the computer software application code base, and performing, on any of the bounded portions affected by the change, a data flow analysis relating to the data flow analysis type.

19 Claims, 4 Drawing Sheets

(56) References Cited

OTHER PUBLICATIONS

Chang et al, "Efficient and Extensible Security Enforcement Using Dynamic Data Flow Analysis", ACM pp. 39-50, 2008.*

Atkinson et al, "Implementation Techniques for Efficient Data-Flow Analysis of Large Programs", IEEE, pp. 1-10, 2001.*

Thakur et al, "Comprehensive Path-sensitive Data-flow Analysis", ACM, pp. 55-63, 2008.*

Mohammad-Amin Jashki, et al., "Towards a More Efficient Static Software Change Impact Analysis Method", ACM SIGLAN/SIGSOFT Workshop on Program Analysis for Software Tools and Engineering, p. 84-90, 2008 Publisher: Association for Computing Machinery.

Paul Lokuciejewski et al., "A Fast and Precise Static Loop Analysis based on Abstract Interpretation, Program Slicing and Polytope Models", 2009 7th Annual IEEE/ACM International Symposium on Code Generation and Optimization (CGO 2009), 136-46, 2009.

Yu Lin, "Incremental Call Graph Reanalysis for AspectJ Software", 2009 IEEE International Conference on Software Maintenance, ICSM 2009, Sep. 20, 2009-Sep. 26, 2009.

* cited by examiner

SELECTIVE DATA FLOW ANALYSIS OF BOUNDED REGIONS OF COMPUTER SOFTWARE APPLICATIONS

BACKGROUND

The present invention relates to computer software analysis and testing.

The term "static analysis" as it relates to computer software typically refers to analysis of the instructions of a computer software application that does not rely on the run-time execution of the application. Static analysis of an application is said to be "sound" if it considers all possible application behavior relevant to the analysis. In one type of static analysis, known as data-flow analysis, a graph is determined of a computer software application's control flows, and information is gathered about the possible values of variables at various points within the application, where the graph is used to determine those parts of the application to which data assigned to a particular variable might flow.

It is well known that once an application has been statically analyzed, any changes subsequently made to the application instructions may affect the soundness of the analysis results. Thus, for example, if an application instruction is deleted, the soundness of the analysis results may be called into question if any data flows identified during the static analysis depended in any way on the deleted instruction. While reanalyzing an entire application each time changes are made to the application instructions assures continuously sound analysis results, the time and computational requirements of doing so may be great, especially for applications with large code bases.

BRIEF SUMMARY

In one aspect of the disclosure can perform data flow analysis of a computer software application. In this aspect, for a data flow analysis type, at least one processor executing code can identify within a computer software application code base a plurality of seeds relating to the data flow analysis type. For each of the plurality of seeds, at least one processor executing code can define a portion of the computer software application code base to a predefined depth of calls backward from the seed and to a predefined depth of calls forward from the seed, thereby resulting in a plurality of bounded portions of the computer software application code base. A change in the computer software application code base can be detected. A data flow analysis relating to the data flow analysis type can be performed on any of the bounded portions affected by the change.

Systems and computer-program products embodying the invention are also provided.

DETAILED DESCRIPTION

Figure 1:
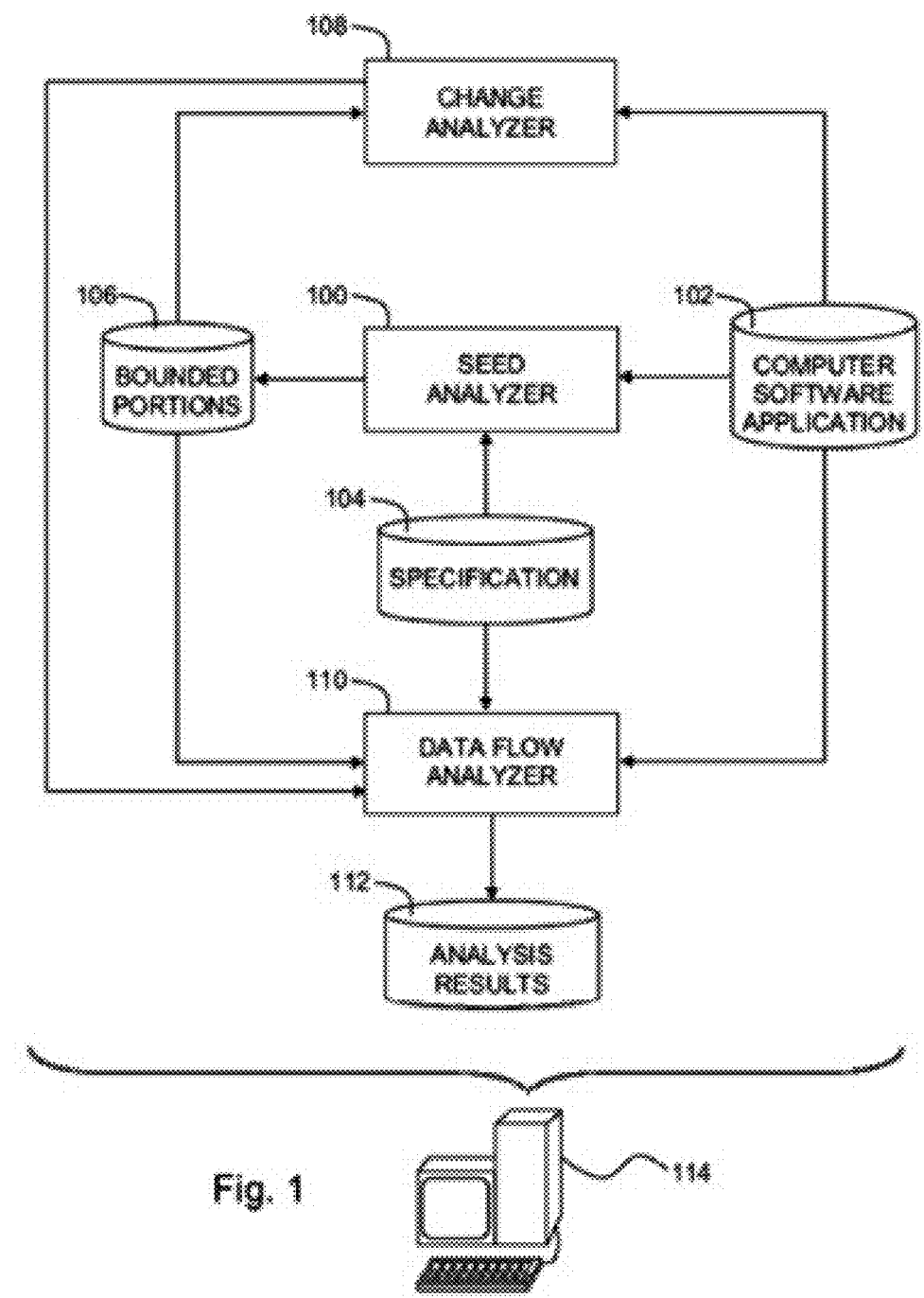
FIG. 1 is a simplified conceptual illustration of a system for performing data flow analysis of a computer software application, constructed and operative in accordance with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for performing data flow analysis of a computer software application, constructed and operative in accordance with an embodiment of the invention. In the system of FIG. 1, a seed analyzer 100 is configured to statically analyze a computer software application 102 in accordance with conventional techniques, such as by analyzing the instructions within a code base of computer software application 102 where the instructions are in the form of source code or bytecode, to identify one or more seeds that relate to a data flow analysis type, such as is indicated in a predefined specification 104. Thus, for example, where the data flow analysis type indicated in specification 104 is a security analysis, seed analyzer 100 preferably identifies the seeds as any calls within computer software application 102 to security sources. Similarly, where the data flow analysis type indicated in specification 104 is a type state verification analysis, seed analyzer 100 preferably identifies the seeds as the allocation sites within computer software application 102 of tracked objects, and where the data flow analysis type indicated in specification 104 is a constant propagation analysis, seed analyzer 100 preferably identifies the seeds as variable declarations within computer software application 102.

For any, and preferably every, seed identified, seed analyzer 100 defines a bounded portion of computer software application 102 to a predefined depth of calls backward from the seed, such as to a depth of three function, method, or procedure calls, and to a predefined depth of calls forward from the seed, such as three calls. The bounded portions or representations thereof, such as in the form of control flow graphs, may be maintained in a data store of bounded portions 106.

A change analyzer 108 is configured to detect a change made to computer software application 102, such as to any of the instructions within the code base of computer software application 102. Change analyzer 108 is also preferably configured to determine which, if any, of the bounded portions 106 are affected by the detected change, such as by determining in which of the bounded portions 106 the change occurred, which can be done by performing change impact analysis, in accordance with conventional techniques, to determine which, if any, of the bounded portions 106 are directly or transitively impacted by the detected change. If the change includes the addition of a new seed, seed analyzer 100 may define new bounded portions and update bounded portions 106 as necessary. Likewise, if the change includes the deletion of an existing seed, seed analyzer 100 may remove any related bounded portions from bounded portions 106 as necessary.

A data flow analyzer 110 is configured to perform static data flow analysis of computer software application 102 in accordance with the data flow analysis type indicated in specification 102 and in accordance with conventional techniques. Data flow analyzer 110 may perform the data flow analysis by analyzing the instructions within the code base of computer software application 102, and/or by analyzing any of the bounded portions 106, and maintain data flow analysis results in a data store 112. Data flow analyzer 110 may optionally be configured to terminate a data flow analysis of a bounded portion after a predefined number of propagation steps from the seed of the bounded portion are analyzed, such as after 14 steps, and/or may be configured to terminate a data flow analysis after a predefined length of time after the data flow analysis is begun, such as after 1 minute.

The system of FIG. 1 may be illustrated in the context of an exemplary operational scenario in which seed analyzer 100 defines bounded portions of computer software application 102 in accordance with the data flow analysis type indicated in specification 102 as described hereinabove, and data flow analyzer 110 performs a sound static data flow analysis of computer software application 102 in accordance with the data flow analysis type indicated in specification 102 and maintains the results of the sound data flow analysis in data store 112. Thereafter, when change analyzer 108 detects a change made to computer software application 102, data flow analyzer 110 performs the data flow analysis indicated in specification 102 on only those bounded portions 106 affected by the change, and updates the results of the data flow analysis prior to the change with the results of the data flow analysis performed on any of the bounded portions affected by the change.

The system of FIG. 1 may be incorporated within, or may otherwise cooperate with, a computer software compiler or a computer software coding tool, where changes made to the computer software application are detected when the application is compiled or when a file containing application instructions is saved, whereupon data flow analysis is performed as described hereinabove on only those bounded portions of the application that are affected by the change, and the results of a previous data flow analysis are updated.

Any of the elements shown in FIG. 1 are preferably executed by or otherwise made accessible to a computer 114, such as by implementing any of the elements in computer hardware and/or in computer software embodied in a physically-tangible, computer-readable medium in accordance with conventional techniques.

Figure 2:
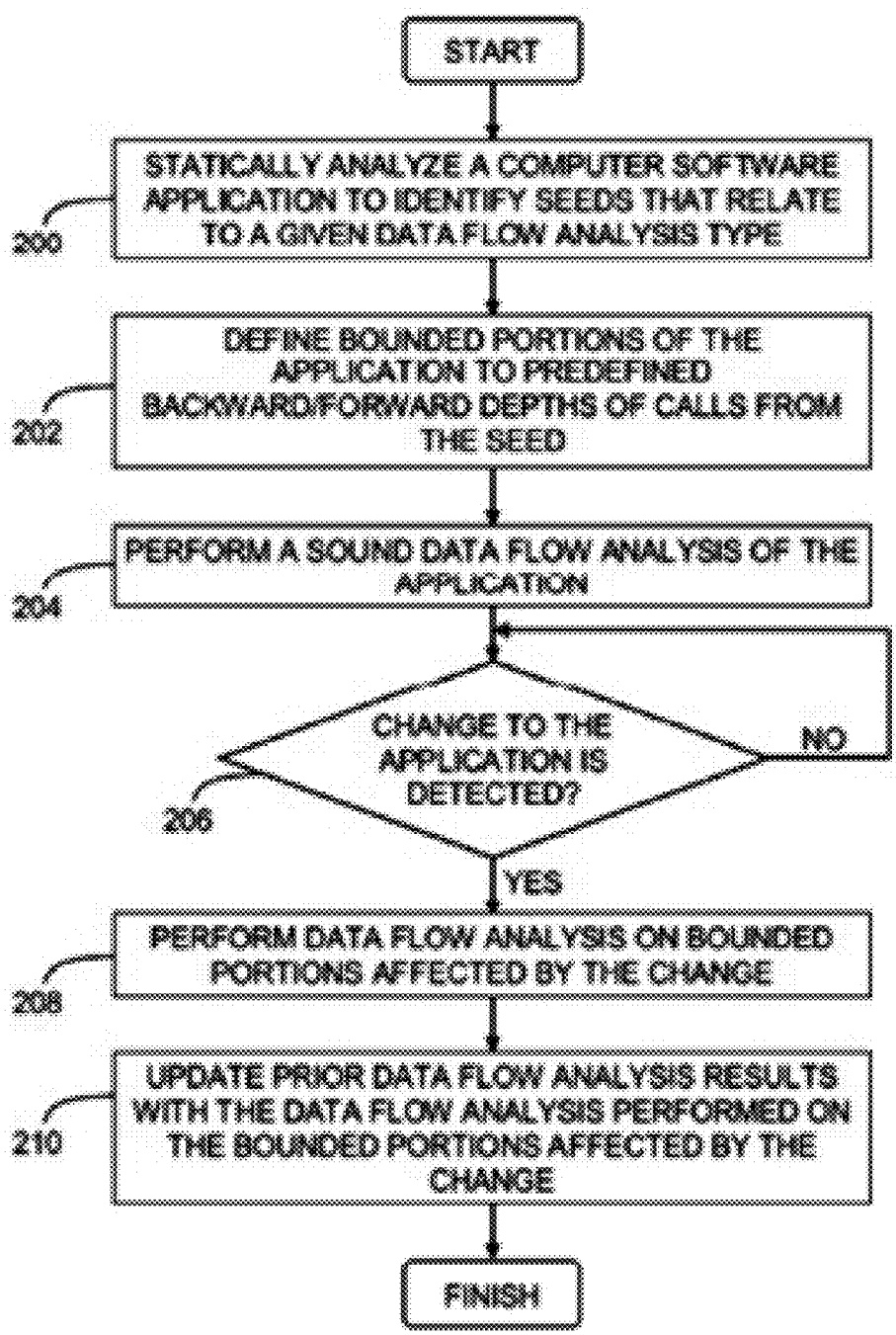
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, a computer software application is statically analyzed to identify one or more seeds that relate to a given data flow analysis type (step 200). For any, and preferably every, seed identified, a bounded portion of the computer software application is defined to a predefined depth of calls backward from the seed (step 202). A sound data flow analysis of the application is performed (step 204). If a change to the computer software application is detected (step 206), the data flow analysis is performed on any of the bounded portions affected by the change (step 208) and any data flow analysis results that preceded the change are updated with the results of the data flow analysis performed on the bounded portions affected by the change (step 210).

Figure 3:
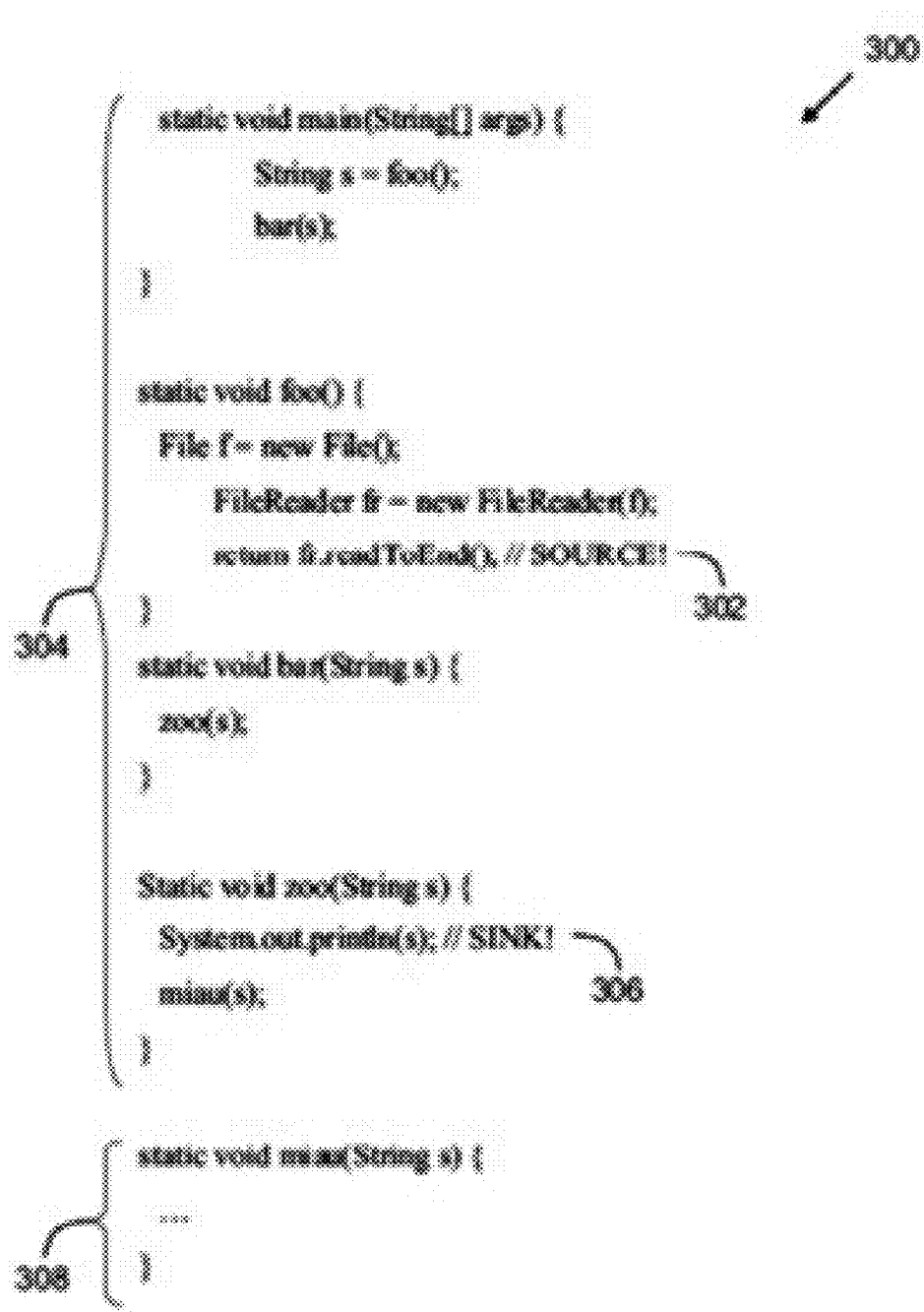
FIG. 3 is an exemplary code snippet illustrating aspects of the invention.

Application of the system of FIG. 1 and method of FIG. 2 may be illustrated by way of example with reference to FIG. 3 in which an exemplary code snippet, generally designated 300, of a computer software application is shown. Assuming a data flow analysis type indicates that a security analysis is to be performed, a seed 302 is identified at a source call within code snippet 300. Assuming a backward/forward call depth of 2 calls, a bounded portion 304 is defined for seed 302. If a change is detected within the application that affects bounded portion 304 in a manner that is relevant to security analysis, such as where a change is made at a sink 306, security analysis is performed of bounded portion 304, but not of a portion 308 of the application that is not within bounded portion 304, unless portion 308 is itself part of another bounded portion of the application that is also affected by the change in a manner that is relevant to security analysis. The results of the analysis of bounded portion 304 may be used to update the results of a previous security analysis of the application.

Figure 4:
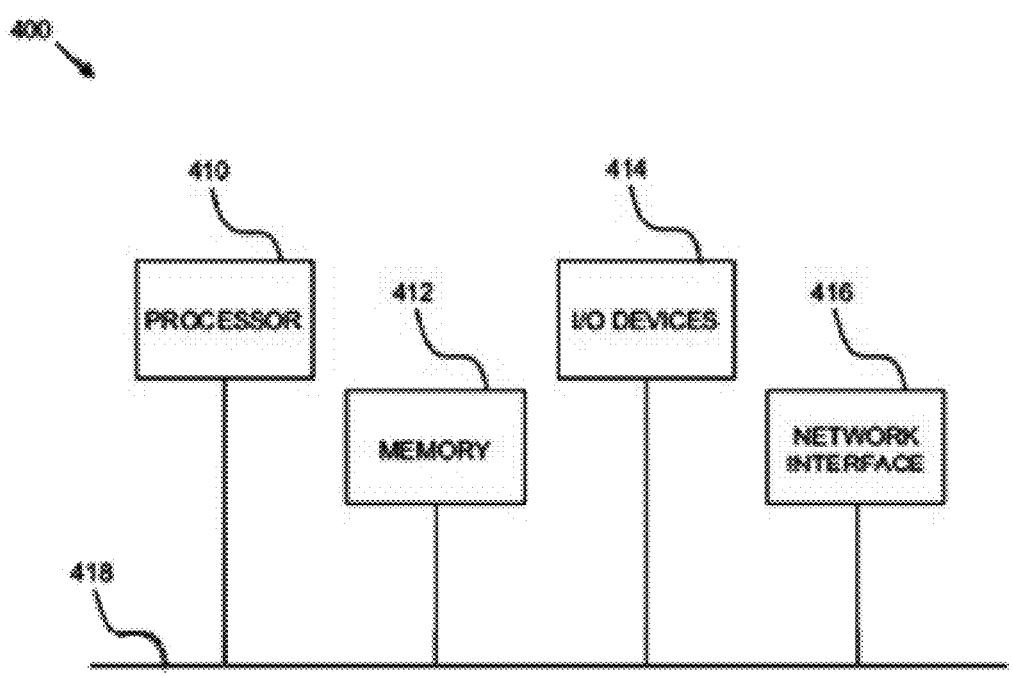
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for performing data flow analysis of a computer software application, the system comprising:
   one or more processors;
   a non-transitory storage medium storing program instructions, which the one or more processors are able to execute;
   a seed analyzer, comprising at least a subset of the program instructions, configured to
   identify within a computer software application code base a plurality of seeds relating to a data flow analysis type, and
      for each of the plurality of seeds, define a portion of the computer software application code base to a predefined depth of calls backward from the seed and to a predefined depth of calls forward from the seed, thereby resulting in a plurality of bounded portions of the computer software application code base;
   a change analyzer, comprising at least a subset of the program instructions, configured to
   detect a change in the computer software application code base, and
      determine which of the bounded portions are affected by the change; and
   a data flow analyzer, comprising at least a subset of the program instructions, configured to perform, on any of the bounded portions affected by the change, a data flow analysis relating to the data flow analysis type, wherein the data flow analyzer is further configured to update results of a data flow analysis of the computer software application performed prior to the change with results of the data flow analysis performed on any of the bounded portions affected by the change.

2. The system of claim 1 where the seed analyzer is configured to identify the seeds as calls to security sources, where the data flow analysis type is a security analysis.

3. The system of claim 1 where the seed analyzer is configured to identify the seeds as allocation sites of tracked objects, where the data flow analysis type is a type state verification analysis.

4. The system of claim 1 where the seed analyzer is configured to identify the seeds as variable declarations, where the data flow analysis type is a constant propagation analysis.

5. The system of claim 1 where the change analyzer is configured to determine in which of the bounded portions the change occurred.

6. The system of claim 1 where the change analyzer is configured to perform change impact analysis to determine which of the bounded portions are directly or transitively impacted by the change.

7. The system of claim 1 where the data flow analyzer is configured to perform the data flow analysis exclusive of any of the bounded portions in which the change did not occur.

8. The system of claim 1 where the data flow analyzer is configured to terminate the data flow analysis after a predefined number of propagation steps from the seed of the bounded portion are analyzed.

9. The system of claim 1 where the data flow analyzer is configured to terminate the data flow analysis after a predefined length of time after the data flow analysis is begun.

10. The system of claim 1 where the seed analyzer is configured to define new bounded portions when the change includes an addition of a new seed.

11. The system of claim 1 where the seed analyzer is configured to delete bounded portions related to a seed, when the change includes deletion of the seed.

12. The system of claim 1 where the data flow analysis is a static data flow analysis.

13. The system of claim 1 where the data flow analyzer is configured to store the data flow analysis results in a data store.

14. The system of claim 1 where the change is detected when the computer software application is compiled.

15. The system of claim 1 where the change is detected when a file containing instructions of the computer software application is saved.

16. A computer program product for performing data flow analysis of a computer software application, the computer program product comprising:
a non-transitory computer-readable storage medium; and
computer-readable program code embodied in the non-transitory computer-readable storage medium, where the computer-readable program code is configured to, for a data flow analysis type, identify within a computer software application code base a plurality of seeds relating to the data flow analysis type;
computer-readable program code embodied in the non-transitory computer-readable storage medium, where the computer-readable program code is configured to, for each of the plurality of seeds, define a portion of the computer software application code base to a predefined depth of calls backward from the seed and to a predefined depth of calls forward from the seed, thereby resulting in a plurality of bounded portions of the computer software application code base;
computer-readable program code embodied in the non-transitory computer-readable storage medium, where the computer-readable program code is configured to detect a change in the computer software application code base;
computer-readable program code embodied in the non-transitory computer-readable storage medium, where the computer-readable program code is configured to perform, on any of the bounded portions affected by the change, a data flow analysis relating to the data flow analysis type; and
computer-readable program code embodied in the non-transitory computer-readable storage medium, where the computer-readable program code is configured to update results of a data flow analysis of the computer software application performed prior to the change with results of the data flow analysis performed on any of the bounded portions affected by the change.

17. The computer program product of claim 16 where the non-transitory computer-readable program code is configured to perform change impact analysis to determine which of the bounded portions are directly or transitively impacted by the change.

18. The computer program product of claim 16 where the non-transitory computer-readable program code is configured to perform the data flow analysis exclusive of any of the bounded portions in which the change did not occur.

19. A computer system for performing selective data flow analysis of a computer software application, the computer system comprising:
one or more processors, one or more computer-readable memories, and one or more computer readable tangible storage devices;
program instructions, stored on at least one of the one or more storage devices for execution by at least one of the one or more processors via at least one of the one or more memories, to, for a data flow analysis type, identify within a computer software application code base a plurality of seeds relating to the data flow analysis type;
program instructions, stored on at least one of the one or more storage devices for execution by at least one of the one or more processors via at least one of the one or more memories, to, for each of the plurality of seeds, define a portion of the computer software application code base to a predefined depth of calls backward from the seed and to a predefined depth of calls forward from the seed, thereby resulting in a plurality of bounded portions of the computer software application code base;
program instructions, stored on at least one of the one or more storage devices for execution by at least one of the one or more processors via at least one of the one or more memories, to, detect a change in the computer software application code base;
program instructions, stored on at least one of the one or more storage devices for execution by at least one of the one or more processors via at least one of the one or more memories, to, perform, on any of the bounded portions affected by the change, a data flow analysis relating to the data flow analysis type; and
program instructions, stored on at least one of the one or more storage devices for execution by at least one of the one or more processors via at least one of the one or more memories, to, update results of a data flow analysis of the computer software application performed prior to the change with results of the data flow analysis performed on any of the bounded portions affected by the change.

* * * * *